June 29, 1965 C. R. CORDELL, JR 3,191,336
FISHING LURE AND METHOD OF MAKING THE SAME
Filed Sept. 24, 1962 2 Sheets-Sheet 1
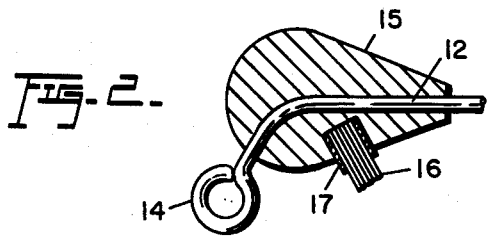
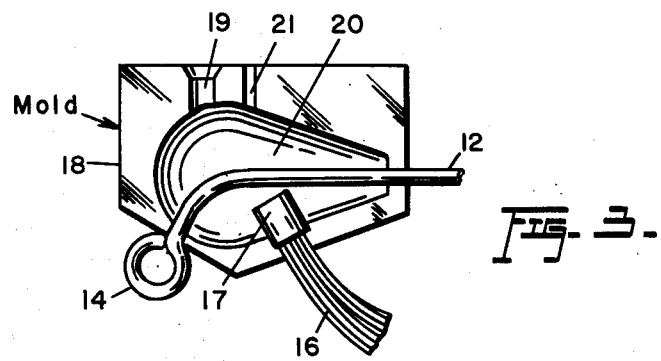
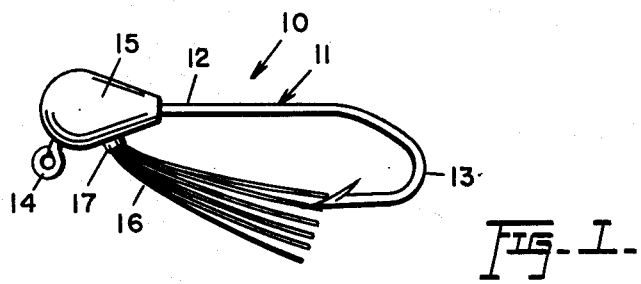
INVENTOR
CARL R. CORDELL, Jr.
BY
ATTORNEY June 29, 1965  C. R. CORDELL, JR  3,191,336
FISHING LURE AND METHOD OF MAKING THE SAME
Filed Sept. 24, 1962  2 Sheets-Sheet 2
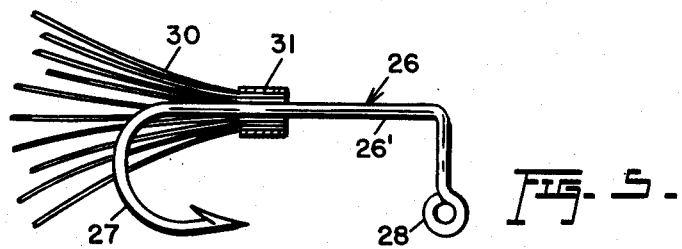
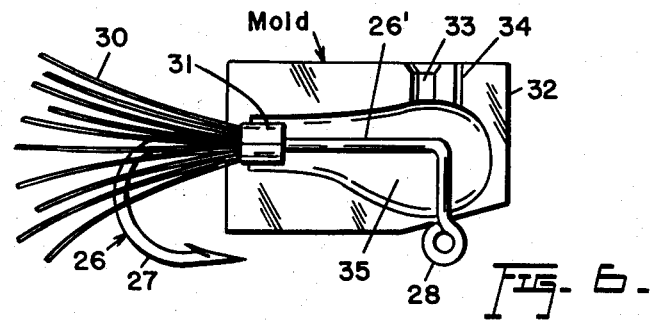
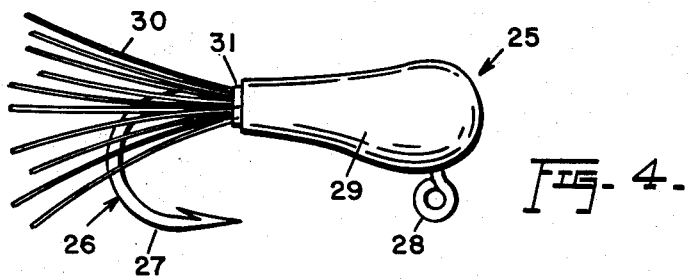
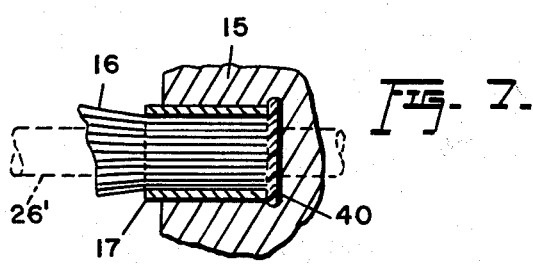
INVENTOR.
CARL R. CORDELL, Jr.
BY
Munson H. Lane
Att'y.

3,191,336
FISHING LURE AND METHOD OF MAKING THE SAME
Carl R. Cordell, Jr., 1211 Richard St., Hot Springs, Ark.
Filed Sept. 24, 1962, Ser. No. 225,715
3 Claims. (Cl. 43—42.24)

This invention relates to new and useful improvements in the art of making artificial fish lures of the general type which comprises a hook weighted by a body of lead and a plume or tuft of filaments connected at one end thereof to the lead body.

The filaments utilized for this purpose usually are derived from animal hair such as bear hair, bucktail hair, squirrel hair, and the like, or synthetic material is used, as for example, polyethylene fibers. In any event, the material of the filaments has a lower melting point or kindling temperature than the melting point of lead, and for this reason it has not been possible in the past to embed the filament tuft in the lead body during the process of molding, inasmuch as the molten lead would melt, burn up, or otherwise destroy the end portion of the filament tuft. Consequently, the conventional procedure for connecting the filament tuft to the lead body necessitated the lead body to be first molded and cooled, whereupon an end portion of the filament tuft was juxtaposed and tied thereto by wrappings of thread.

This conventional procedure of lure making possessed several disadvantages, the most prominent of which was the tedious operation of tying the filament tuft to the lead body. If performed by the fisherman himself, the tying operation was time consuming and often annoying, particularly to persons without exceptionally good sight. If performed by a lure manufacturer, the tying operation also involved a time element as well as the use of tying fixture and attendant labor, so that the cost of the lure was unduly high. Moreover, in any event the tied thread could not always be depended upon to securely hold the filament tuft in proper place, it being apparent that separation of the filament tuft from the lead body would render the lure entirely useless.

It is, therefore, the principal object of this invention to eliminate the various disadvantages as above outlined, this object being attained by a novel procedural step in the making of the lure which permits an end portion of the filament tuft to be embedded directly in the lead body of the lure during the process of molding, without any melting, burning up or other damaging of the filaments.

In accordance with the invention, the end portion of the filament tuft which is to be embedded in the lead body is first enclosed in a sleeve of suitable material which has a melting point higher than that of lead, so that when the sleeve enclosed end portion of the filament tuft is placed in a mold and molten lead is poured around the same, the sleeve effectively protects the filaments against heat damage and the filament tuft becomes securely embedded in the lead body as the latter cools.

It will be apparent from the foregoing that apart from its primary purpose of making possible a direct connection of the filament tuft to the lead body without damage of the tuft, the invention substantially expedites the lure making procedure in that the connection of the filament tuft to the lead body is made at the same time as the lead body is molded. Moreover, the embedding of the filament tuft in the lead body provides a secure connection which, unlike the conventional thread tying, is fully dependable.

Along with the aforementioned novel step in the process of making the lure, the invention also involves a novel product, that is, the lure itself, wherein an end portion of the filament tuft is embedded in the lead body. For reasons already mentioned, conventional lures did not have this structural characteristic, since the making thereof by conventional methods was an impossible task.

Further advantages and features of the invention may become apparent from the following description taken in conjunction with the accompanying drawings, wherein like characters of reference are used to designate like parts, and wherein for illustrative purposes:

FIGURE 1 is a side elevational view of a fish lure made in accordance with the invention;

FIGURE 2 is an enlarged, fragmentary longitudinal sectional view thereof;

FIGURE 3 is a fragmentary view showing the hook shank and sleeve enclosed filament tuft in a mold section, prior to pouring of the lead body;

FIGURE 4 is a side elevational view showing a modified embodiment of the lure;

FIGURE 5 is a view, partly in elevation and partly in section, showing the embodiment of FIGURE 4 prior to the molding of the body thereon;

FIGURE 6 is an elevational view of the device of FIGURE 5 in position in a mold section; and FIGURE 7 is an enlarged fragmentary sectional detail showing the anchorage of the filament tuft in the lead body.

Referring now to the accompanying drawings in detail, particularly to FIGURES 1–3, the general reference numeral 10 designates an artificial fish lure in accordance with the invention. The lure 10 compries a more-or-less conventional fish hook 11 including a shank 12, a bill 13 and a line attaching eye 14. The shank 12 is weighted by a lead body 15 disposed adjacent the eye 14, and a plume or tuft of filaments 16 is connected at one end thereof to the body 15, as will be hereinafter described. If desired, the filament tuft 16 may extend to the point of the hook bill 13 so as to form a weed guard, that is, to prevent the point of the hook from becoming caught on weeds or other submerged obstructions, when the lure is in use.

The filaments in the tuft 16 may be derived from animal hair such as bear hair, bucktail hair, squirrel hair, et cetera, or they may be of synthetic material, as for example, polyethylene fibers. As such, the material of the filaments has a lower melting point or kindling temperature than the melting point of lead from which the body 15 is molded, and it therefore follows that the end portion of the filament tuft cannot be embedded directly in the lead body during the process of molding, without melting, burning up, or other damaging of the filaments by heat.

However, in the process of making the lure in accordance with the invention, the end portion of the filament tuft 16 which is to be embedded in the lead body 15 is first enclosed in a tubular jacket 17 which is made of any suitable material, preferably metallic material having a melting point higher than that of lead. The jacket 17 may simply assume the form of a metallic strip which is wrapped around the end portion of the filament tuft, or it may initially have a tubular form and have the end portion of the filament tuft inserted thereinto.

In any event, after the jacket 17 is applied to the end portion of the tuft 16, it is placed in a suitable mold 18, along wth the eye end portion of the hook shank 12. Only a half-section of the mold is shown for illustrative purposes, it being understood that a complemental half section is also employed, so that molten lead may be poured through an inlet 19 into the mold cavity 20 while air escapes from the mold cavity through a vent passage 21.

When the mold cavity 20 is filled with molten lead, the shank 12 of the hook as well as the sleeve 17 with the end portion of the filament tuft 16 will become embedded in the lead body 15, thus firmly securing the hook and the filament tuft to the lead body, without any heat damage to the filaments themselves.

FIGURES 4–6 illustrate a slightly modified embodiment of the lure which is designated generally by the reference numeral 25 and comprises a hook 26 having an angulated shank 26' equipped with a bill 27 and an eye 28. The hook shank 26 is embedded in a lead body 29, and also embedded in the lead body is one end portion of a filament tuft 30, enclosed in a protective sleeve 31. The filament tuft 30 and the sleeve 31 correspond, respectively, to the tuft 16 and sleeve 17 already described in connection with the lure 10, except that while in the lure 10 the sleeve 17 is embedded in the body 15 at one side of the hook shank 12, in the lure 25 the end portion of the filament tuft 30 surrounds the hook shank 26' and the sleeve 31 is wrapped around the end portion of the filament tuft on the hook shank. As a result, the hook bill 27 projects laterally outwardly from the filament tuft, as will be readily apparent.

In the process of making the lure 25, the end portion of the filament tuft 30 is placed around the hook shank 26' and the sleeve 31 is positioned on or wrapped around the same, as shown in FIGURE 5. Thereupon, the unit thus far assembled is placed in a mold 32 as shown in FIGURE 6, the mold having an inlet 33 and a vent 34 so that molten lead may be poured into the mold cavity 35 to form the lead body 29.

FIGURE 7 is a detailed illustration which shows a special anchoring feature of the filament tuft in the lead body. If the sleeve 17 is applied to the end portion of the filament tuft 16 so that the filaments project slightly from the inner end of the sleeve, during the molding process of the lead body 15 around the sleeve the projecting filament ends will become fused together and laterally flared or expanded as shown at 40. Then, when the body 15 solidifies, the laterally expanded fusion 40 of the filament ends will provide an effective anchorage whereby the filaments will be positively prevented from being wthdrawn from the lead body. It may be noted that while FIGURE 7 illustrates this anchoring feature in connection with components of the lure 10, the same is also applicable, of course, to the components of the lure 25, as is evidenced by the dotted line showing of the hook shank 26' in the same figure.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a process for making a fishing device which includes a lead body having embedded therein one end portion of a tuft of filaments of material characterized by a melting point lower than that of lead; the steps of enclosing the end portion of the filament tuft in a sleeve of material having a melting point higher than that of lead and permitting terminal ends of the filaments to project from the sleeve, placing the end portion of the filament tuft with its enclosing sleeve in a mold, and pouring molten lead into the mold so that said sleeve with the end portion of the filament tuft therein becomes embedded in the lead body and so that the terminal ends of the filaments projecting from said sleeve become fused and laterally expanded in the lead body to prevent their withdrawal therefrom.

2. In a fishing device, the combination of a lead body, a tuft of filaments of material having a melting point lower than that of lead, a sleeve of material having a melting point higher than that of lead, said sleeve enclosing an end portion of said filament tuft and being embedded therewith in said body, terminal ends of filaments in said tuft projecting beyond said sleeve, said projecting terminal ends being embedded in said body and forming laterally expanded anchorage means in said body whereby to prevent the filaments from being withdrawn.

3. In a fishing device, the combination of a lead body, a tuft of filaments of material having a melting point lower than that of lead, a sleeve of material having a melting point higher than that of lead, said sleeve enclosing an end portion of said filament tuft and being embedded therewith in said body whereby to protect the filament tuft against damage by heat, terminal ends of filaments in said tuft projecting beyond said sleeve into said body and being fused and laterally expanded beyond the outer periphery of said sleeve, whereby to provide anchorage means for preventing the filaments from being withdrawn.

References Cited by the Examiner

UNITED STATES PATENTS

| 1,420,422 | 6/22 | Foss | 43—42.25 |
| 1,557,083 | 10/25 | Peckinpaugh | 43—42.53 X |
| 1,994,692 | 3/35 | Davenport | 43—42.27 |
| 3,017,307 | 1/62 | Hilliburton | 43—42.53 X |

FOREIGN PATENTS 547,425  10/57  Canada.

SAMUEL KOREN, *Primary Examiner*.

JOSEPH S. REICH, *Examiner*.